United States Patent
Pipes et al.

(10) Patent No.: US 9,944,026 B2
(45) Date of Patent: Apr. 17, 2018

(54) METHOD AND SYSTEM OF VACUUM ASSISTED RESIN TRANSFER MOLDINGS FOR REPAIR OF COMPOSITE MATERIALS AND STRUCTURE

(75) Inventors: R. Byron Pipes, Lafayette, IN (US); Ian Cameron Coker, Victoria (AU); Douglas Edward Adams, West Lafayette, IN (US); Ronald Sterkenburg, West Lafayette, IN (US); Jeffrey P. Youngblood, Crawfordsville, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 330 days.

(21) Appl. No.: 14/115,886

(22) PCT Filed: May 4, 2012

(86) PCT No.: PCT/US2012/036483
§ 371 (c)(1),
(2), (4) Date: Mar. 24, 2014

(87) PCT Pub. No.: WO2012/154544
PCT Pub. Date: Nov. 15, 2012

(65) Prior Publication Data
US 2014/0196833 A1 Jul. 17, 2014

Related U.S. Application Data

(60) Provisional application No. 61/483,324, filed on Jun. 5, 2011.

(51) Int. Cl.
*B29C 73/10* (2006.01)
*B29C 73/02* (2006.01)
(Continued)

(52) U.S. Cl.
CPC ............ *B29C 73/02* (2013.01); *B29C 70/443* (2013.01); *B29C 73/10* (2013.01); *B29C 73/12* (2013.01);
(Continued)

(58) Field of Classification Search
USPC ...................................... 156/94, 98
See application file for complete search history.

(56) References Cited

U.S. PATENT DOCUMENTS 5,618,606 A * 4/1997 Sherrick ................. B29C 73/10
156/286
6,149,749 A * 11/2000 McBroom ............... B29C 73/02
156/87

(Continued)

FOREIGN PATENT DOCUMENTS

| JP | 2004-106548 A | 4/2004 |
| JP | 2005-271247 A | 10/2005 |

(Continued)

OTHER PUBLICATIONS

From the International Bureau "Notification Concerning Transmittal of International Preliminary Report on Patentability"; dated Nov. 21, 2013 (Nov. 21, 2013); pp. 1-9.

*Primary Examiner* — Jeffry H Aftergut
*Assistant Examiner* — Jaeyun Lee
(74) *Attorney, Agent, or Firm* — Taft Stettinius & Hollister LLP; Stephen F. Rost

(57) ABSTRACT

The present disclosure provides a method of repairing a damaged portion of a panel formed of composite material. The method includes preparing the damaged portion for repair and applying a pressure responsive adhesive layer to substantially cover the damaged portion. The method also includes disposing a vacuum-assisted resin transfer molding repair patch assembly to substantially cover the damaged portion and substantially covering the repair patch assembly (Continued)

with a vacuum bag assembly. Resin is introduced into and impregnates the repair patch assembly. The repair patch assembly is cured after being impregnated.

11 Claims, 7 Drawing Sheets

(51) Int. Cl.
  *B29C 70/44* (2006.01)
  *B29C 73/12* (2006.01)
  *B29C 73/34* (2006.01)
  *B29C 35/02* (2006.01)
  *B29C 73/26* (2006.01)

(52) U.S. Cl.
  CPC .............. *B29C 35/02* (2013.01); *B29C 73/34* (2013.01); *B29C 2073/262* (2013.01)

(56) References Cited

U.S. PATENT DOCUMENTS

| | | | |
|---|---|---|---|
| 8,747,592 B2* | 6/2014 | Stenbaek | 156/285 |
| 2002/0022422 A1* | 2/2002 | Waldrop, III | B29C 70/443 442/179 |
| 2003/0011094 A1* | 1/2003 | Filsinger | B29C 70/086 264/102 |
| 2006/0172111 A1* | 8/2006 | Polus | B29C 70/088 428/73 |
| 2009/0053406 A1* | 2/2009 | Ackerman | B29C 73/10 427/142 |
| 2009/0269547 A1* | 10/2009 | Meyer | B29C 44/1228 428/116 |

FOREIGN PATENT DOCUMENTS

| | | |
|---|---|---|
| KR | 10-2004-0014630 A | 2/2004 |
| KR | 10-2009-0051628 A | 5/2009 |

* cited by examiner

METHOD AND SYSTEM OF VACUUM ASSISTED RESIN TRANSFER MOLDINGS FOR REPAIR OF COMPOSITE MATERIALS AND STRUCTURE

RELATED APPLICATIONS

This application is a U.S. national stage application under 35 U.S.C. § 371 of PCT International Application Serial No. PCT/US2012/036483, which has an international filing date of May 4, 2012, designates the United States of America, and claims the benefit of U.S. Provisional Application No. 61/483,324, which was filed on May 6, 2011. The disclosures of each of these prior applications are hereby expressly incorporated by reference in their entirety.

GOVERNMENTAL SUPPORT INFORMATION

This invention was made with government support under grant number N00178-04-D-4026 awarded by the Naval Surface Warfare Center. The Government has certain rights in the invention.

FIELD OF THE DISCLOSURE

The present disclosure is related to composite materials, and in particular, to the repair of composite materials using a vacuum assisted resin transfer molding process.

BACKGROUND

Aircraft, including fixed wing aircraft, and wind energy blades can be made of a composite material. During operation, for example, the composite structure can be damaged due to ballistic and other sources. The damaged structure can create passages through which moisture and other contaminants can penetrate and further damage the material. In an aircraft, the damaged structure can also affect the crew's confidence in the integrity of the airframe. In some instances, the damage can be severe enough that the composite material must be repaired before the aircraft can resume operations.

If a repair is required, current methods are undesirable for several reasons. First, many of the current repair materials must be stored under specific conditions. With limited resources, it can be difficult to meet these storage requirements. Also, the ability to repair the damaged composite structure can require significant time and resources. Thus, the aircraft may be unavailable for use until such repairs can be made. In addition, many of the repairs require specialized training for the crew.

Carbon fiber material can provide the most durable repair, but conventional wet layup repair processes can be messy and time consuming. These processes require special storage requirements and often lead to inconsistent repair quality.

Thus, a need exists for a process of repairing a composite material such as a panel on an aircraft. There is an additional need for a system or system that can quickly complete the method of composite repair and also provide an automated, interactive training and repair software for completing the repair process.

SUMMARY

In one embodiment of the present disclosure, a method is provided of repairing a damaged portion of a panel formed of composite material. The method includes preparing the damaged portion for repair and applying a pressure responsive adhesive layer to substantially cover the damaged portion. The method also includes disposing a vacuum-assisted resin transfer molding repair patch assembly to substantially cover the damaged portion and substantially covering the repair patch assembly with a vacuum bag assembly. Resin is introduced into and impregnates the repair patch assembly. The repair patch assembly is cured after being impregnated.

In one aspect, the preparing step can include removing the damaged portion from the panel. In another aspect, the preparing step can include replacing the damaged portion with a honeycomb core material. In a different aspect, the method can include cleaning the damaged portion and nearby area with a cleansing tool.

After the curing step, the method can include removing the pressure responsive adhesive layer. A heat blanket can be disposed over the repair patch assembly so that the repair patch assembly can be preheated to a desired temperature. The preheating step can remove air or volatile material from the repair patch assembly.

In a different aspect, the method can include mixing the resin in a cartridge and coupling the cartridge to an inlet side of the repair patch assembly. The impregnating step can be discontinued when resin begins to pass through an outlet side of the repair patch assembly. In addition, the introducing step can be controlled by opening or closing an inlet valve or outlet valve. The curing step of the method can further include increasing the temperature of the repair patch assembly to a temperature greater than 100° C.

In another embodiment, a VARTM repair system is provided for a composite panel of an aircraft. The system comprises a repair patch assembly including a plurality of layers. The assembly can include an adhesive layer for coupling to the panel and a first vacuum bag having an inlet. The system includes a cartridge adapted to contain resin and a pump having a port. The port is coupled to the inlet of the bag. The system further includes an inlet valve, an outlet valve, and a first tubing, a second tubing and a third tubing. The first tubing is coupled between the cartridge and an inlet side of the repair patch assembly. The first tubing includes the inlet valve configured to control an amount of resin dispersed into the repair patch assembly. The second tubing has is coupled to an outlet side of the repair patch assembly and has the outlet valve. The third tubing is coupled between the pump and port for delivering a pressure response to the repair patch assembly.

In one aspect of this embodiment, the system can include a heat-generating assembly coupled to the repair patch assembly. The heat-generating assembly includes a heat bonder apparatus, a temperature sensor, and a heat blanket disposed near the repair patch assembly for delivering a temperature response thereto. In another aspect, the repair patch assembly comprises a transfer medium configured to facilitate resin flow, an injection plate, and scrim material adapted to add thickness and strength to the adhesive layer. In a different aspect, the system includes a computer, digital tablet, or controller for operably controlling the system.

In a different embodiment of the present disclosure, a system is provided for a vacuum-assisted resin transfer molding repair. The system includes one or more repair patch assemblies, at least one resin cartridge, a surface preparation tool, and a repair equipment tool. In one aspect, the one or more repair patch assemblies includes a piece of scrim material. In another aspect, the surface preparation tool comprises a writing utensil, a sander, sandpaper, acetone, or alcohol. In a further aspect, the repair equipment tool comprises a glove, safety glasses, tack spray, vinyl hosing, a vacuum port, a ruler, a roller, a compass, a shear tool, a cutting tool, tape, vacuum bagging, or tape. The system can also include a container for housing the one or more repair patch assemblies, the at least one resin cartridge, the surface preparation tool, and the repair equipment tool.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Field repair methods for a composite structure can require that the elements of the repair consist of components with long-term shelf life at ambient field conditions and that the repair be carried out with only a modest level of technical expertise. It is desired that any liquid mixing process be fully contained so as protect the repair technician and the local environment from contamination. Surface preparation should require only modest abrasion. Further, simplicity in execution is a central requirement if success is to be guaranteed. In addition, the complete repair system can be desirably housed in a single container of appropriate size to meet storage requirements.

The available power supply is advantageously consistent with that available in the field either on the vehicle or at a suitable location. This power system can be restricted to that necessary to drive a small vacuum pump and thermal blanket. A systematic integration of repair components to provide a "peel and stick" first application of the repair to the substrate can also be desirable to prevent errors in repair assembly at the field site.

Another desired attribute is integrating a digital tablet or other hand-held microprocessor into the field repair system. This can also provide the information necessary to guide field personnel in the execution of the repair. Vehicle geometry and material systems can be described and using a series of questions and diagrams to guide the choice of the repair components for each specific damage type and size and each step of the repair.

Conventional repair systems, such as a double-debulk repair method, require proper storage of components before use. VARTM field repair, however, can be accomplished without the need for cold storage of the paste adhesive. The VARTM process produces both the adhesive layer and impregnated repair fabric at the same time with a two-part resin system that has a long ambient shelf life. The two-part resin system can be housed in a device that keeps the two components separated until the mixing action begins and allows mixing without exposing the resin to the environment.

Figure 1:
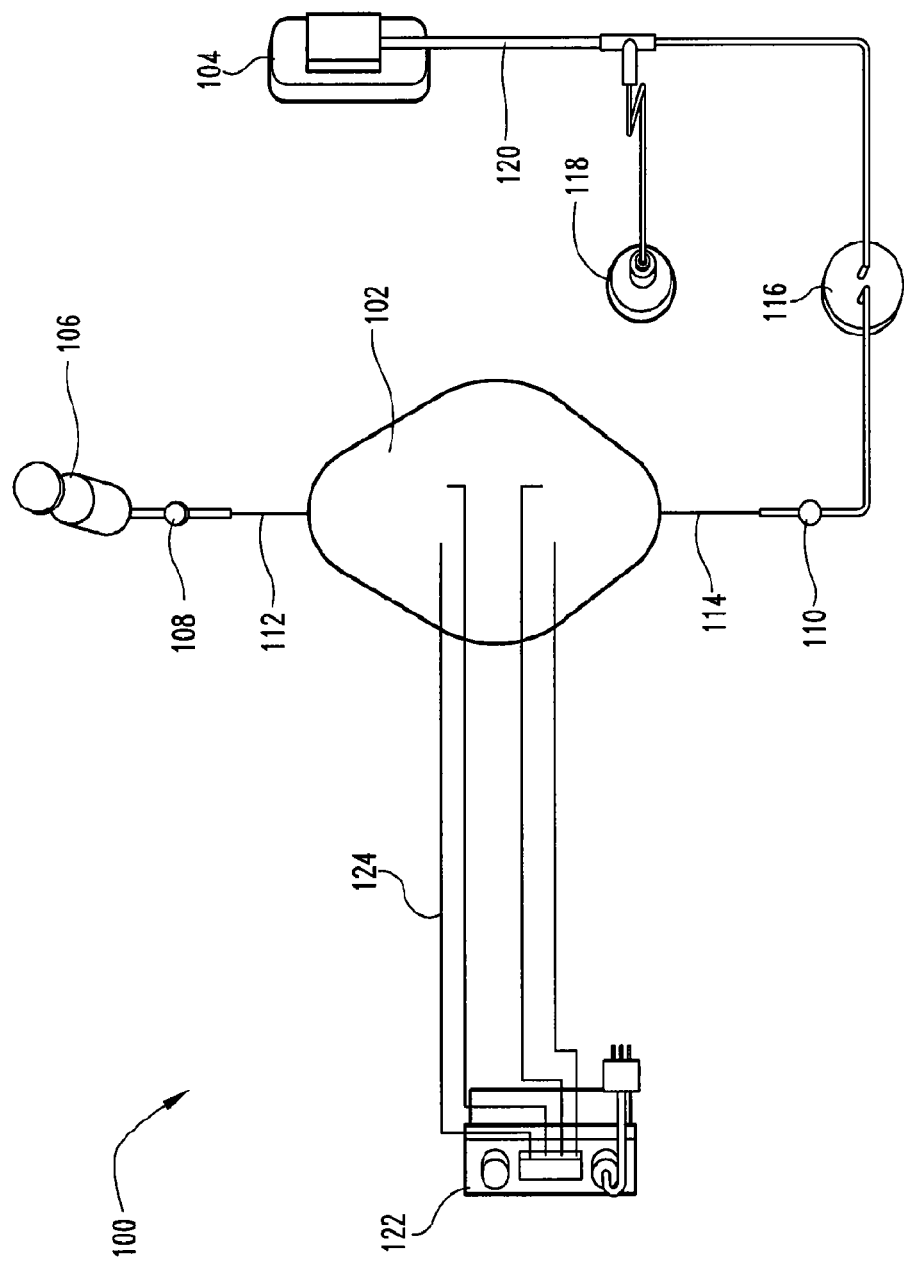
FIG. 1 is a schematic view of a VARTM repair system.

Referring to FIG. 1, the preassembled dry fabric system 100 can be applied as a "peel and stick" assembly 102 and the resin system is drawn from a cartridge 106 into the fabric by similar steps as vacuum-assisted resin transfer molding (VARTM). A vacuum pump 104 can be coupled to the resin cartridge 106 and patch assembly 102 via tubing 120. By initially activating the pump 104 and applying the vacuum before impregnation, air contained within the repair fabric can be substantially removed. A vacuum port 118 can be coupled to the pump 104 via tubing 118. During the repair process, the port 118 is coupled to the repair patch assembly 102, and in particular to a vacuum bag to induce a pressure response therein.

The applied vacuum pressure can also pull a premeasured amount of resin from the cartridge 106 into the evacuated fabric and thereby control the resin amount. Although not shown, a controller or microprocessor can be coupled to the system 100 to achieve precise control of the resin content. The adhesive layer can be formed by constructing the assembly to provide a mechanism for formation of a resin rich layer at the substrate surface.

Vacuum assisted resin transfer molding (hereinafter, "VARTM") is a process of forming a consolidated composite laminate consisting of reinforced fibers and polymeric matrices. Dry fiber forms are impregnated with a liquid polymer resin system and fully integrated without the presence of voids or foreign material. As described, after bagging the fiber preform, a vacuum is applied to the fully encapsulated dry fiber preform and the liquid resin is drawn into the preform by vacuum pressure driven flow. Enhanced resin flow can be accomplished by a flow media placed on the non-tool side surface of the fiber preform so that as the liquid is dispersed over the surface it flows through the thickness of the preform to complete the flow process. Under these conditions, the tool-side surface is virtually of the same fiber volume fraction as that of the average of the composite produced and little or no excess resin remains on the tool-side surface. The VARTM process can be modified for use in repair of damaged composite materials and structures constructed of these systems.

Figure 9:
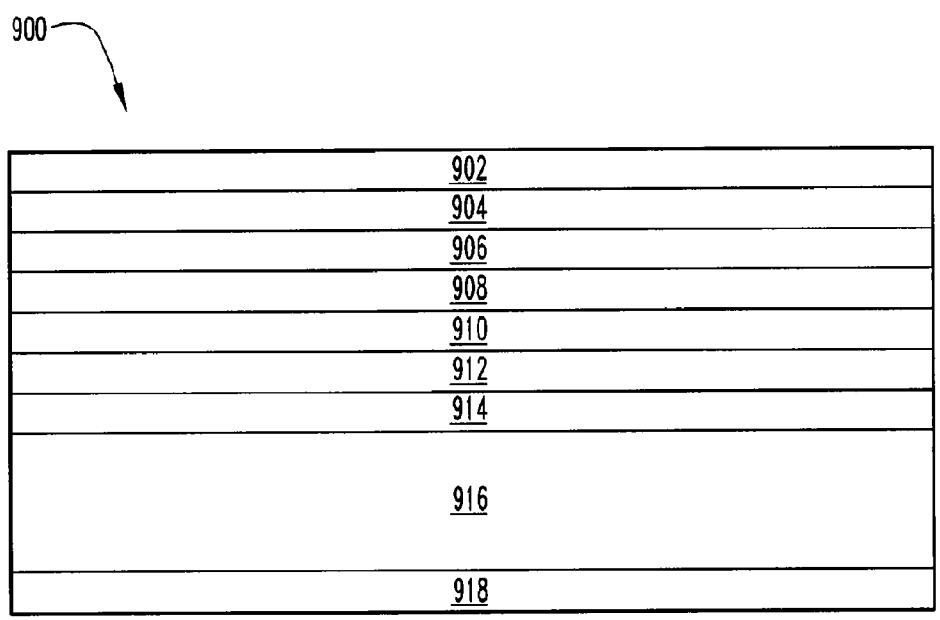
FIG. 9 is a schematic view of layers of a VARTM repair patch assembly.

The VARTM repair process can differ from conventional VARTM processes used for manufacturing. Referring to FIG. 9, for example, the repair process can include a pre-assembled preform having several layers such as a transfer medium 908, one or more layers of carbon fiber 916, scrim material 918, an injection plate 910, and injection tubes. The preform can also include a Teflon® peel ply layer 912 and a fiberglass sanding ply layer 914. This process can incorporate an Endurance 4505 resin system, but could also be adapted to other low viscosity resin systems. After the pre-assembled stick and peel repair patch 102 is installed, the injection plate 910 can be heated by a heat bonder apparatus 122. The heat bonder apparatus 122 can be thermally coupled to a heater blanket 906 which applies heat to the assembly 102. The assembly 102 can include a vacuum bag 902 coupled to the vacuum pump 104 and a breather layer 904 disposed between the bag 902 and heater blanket 906. Thermocouples 124 or a temperature sensor can be coupled to or near the patch assembly 102 to measure the temperature thereof. The temperature can be set at about 66° C. for about 15 minutes before impregnation of the repair patch.

A transfer medium 908 can be disposed on top of the injection plate 910 to facilitate the flow of resin. An inlet valve 108 and outlet valve 110 are disposed in the inlet tube 112 and outlet tube 114, respectively. The valves 108, 110 can control the resin flow from the resin cartridge 106 and patch assembly 102. A small resin trap 116 is configured to collect excess resin. As soon as the resin is introduced to the transfer medium 908 it will contact the hot injection plate 910 and the viscosity of the resin will decrease. The resin may impregnate the repair patch 102 through small holes in the injection plate 910. When the patch 102 is fully impregnated, the temperature of the heater blanket 906 and injection plate 910 can be increased (e.g., to about 110° C. for about 3 hours) to cure the repair. Although FIG. 9 represents one embodiment of a preform, the present disclosure contemplates alternative embodiments where additional layers can be incorporated. Alternatively, the layers can be rearranged for a given application.

An advantage of the VARTM repair process is the ability to simplify the repair process and eliminate human error that could result in mistakes in the repair of composite objects such as aircraft. In conventional wet lay-up type repair processes, maintenance personnel must mix two part resins, lay-up the repair plies in the correct orientation, and use the correct vacuum bag materials in the right sequence to vacuum bag the repair. For prepregnated repairs, the materials need to be stored in a controlled environment at a low temperature and are not readily available for technicians working in line maintenance environment. These additional, but required, steps can introduce a mistake into the repair process. Therefore, the present disclosure provides a process that eliminates these steps and improves the quality of the repair process.

As previously described, the VARTM repair process uses a pre-assembled stick and peel patch system that contains the repair material, scrim cloth, transfer medium, injection tubes, and injection plate. Unlike conventional repair processes, maintenance personnel only has to clean or prepare the damaged area and place the pre-assembled stick and peel VARTM patch 102 substantially over the damaged area. The personnel can then activate the heat bonder apparatus 122 to preheat the repair patch assembly 102, connect the two component resin SEM system 106, 116, and apply the vacuum pump 104. As the vacuum is applied, the patch assembly 102 is impregnated and, following impregnation, the repair is cured. These steps can be performed in a different order and there may be additional steps for completing the repair process. This is further described with respect to FIG. 2.

Figure 2:
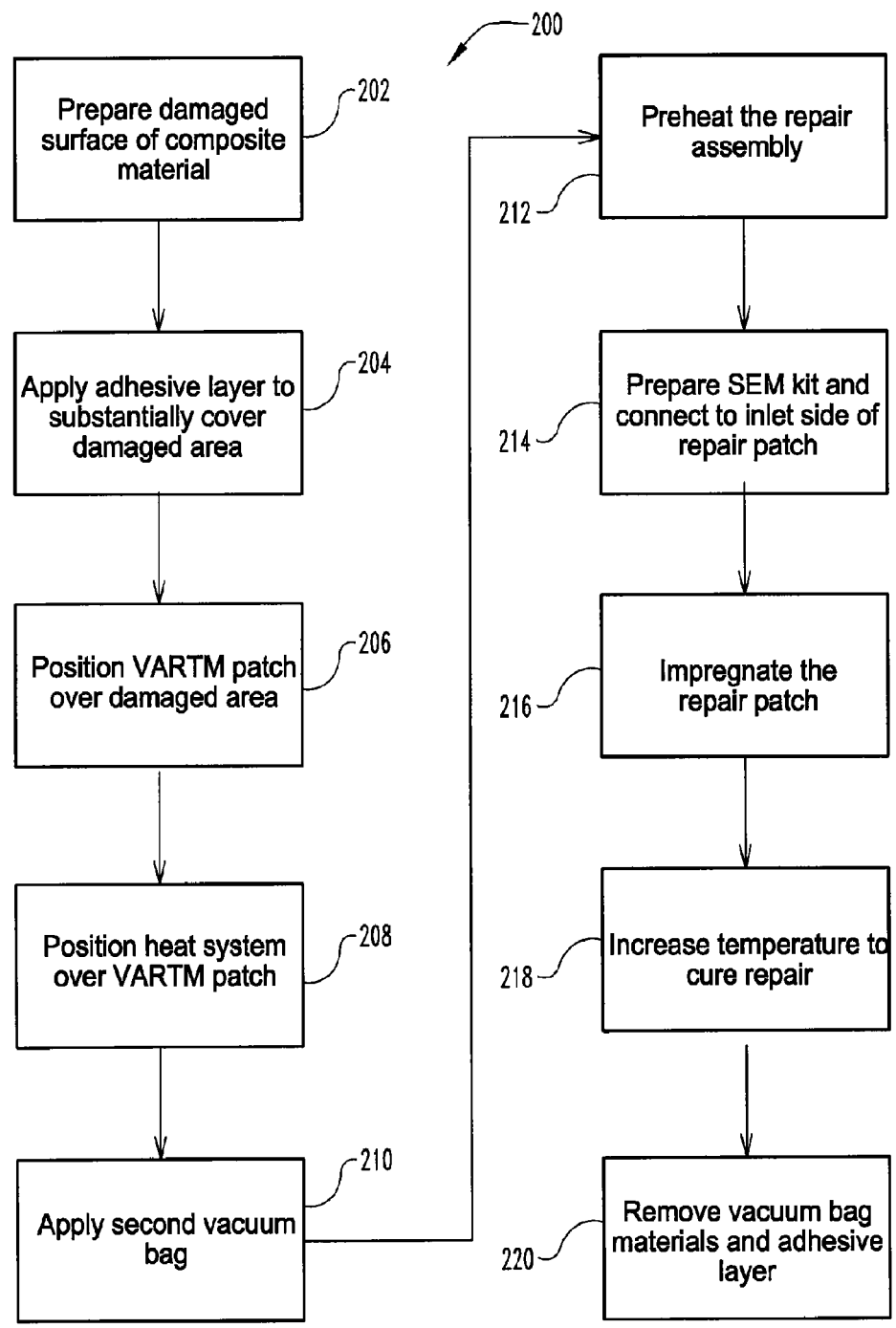
FIG. 2 is a flow diagram of an VARTM repair process.

Referring to FIG. 2, a method 200 of repairing a damaged composite is provided. Once an area of damaged composite is identified in a panel of an aircraft, for example, the damaged surface can be prepared for repair according to a first step 202. To do so, the damaged area may have to be completely removed, including the internal core region. The internal core region can be a honeycomb material as will be described below. A new core material is placed in the damaged area. The damaged area may also be cleaned with an acetone cleansing product. In addition, the damaged area may be scuffed with sandpaper or an abrasive pad to further prepare the damaged surface for repair.

Once the damage material is removed and the remaining composite laminate is cleaned, the damaged surface is prepared for adhesion by a liquid polymer system. The liquid polymer system can include an epoxy, polyester, vinylester or an equivalent thermosetting polymer system. According to step 204, an adhesive layer is disposed over the damaged area to provide a seal so that vacuum can be accomplished during the VARTM process. It can be desirable for the size of the adhesive layer to be such that the damaged area is completely covered by the layer. Advantageously, the sealing material can be at least slightly larger in size (e.g., diameter) than the damaged area so that the material can be adhered to the laminate. The sealing material can overlap the damaged area by 0.10-0.50" and effectively seal the damaged area from air or other gases from penetration.

The sealing material can consist of a thin metallic foil such as titanium or equivalent or a precured composite laminate of glass, Kevlar or carbon fiber (e.g., a dry fiberglass film). The sealing layer is adhered to the surface of the laminate being repaired with an adhesive compatible with the repaired laminate and the VARTM resin system. The size and shape of the sealing material can vary. For instance, the sealing material can come in square, rectangular, or circular shapes. After the damaged composite area has been sealed by the sealing layer, the sealed surface is prepared for adhesion by the VARTM resin.

In step 204, it is desirable to create or develop an adhesive layer thickness between the composite material and/or structure to be repaired and the VARTM-produced laminate. Without a sufficient adhesive layer thickness, the structural adhesion between the repair and the damaged system is minimal and therefore the repair is incomplete. This is due to the VARTM resin's ability to contact the surface being repaired. Conventional repair methods have been unable to achieve a desired adhesive layer, and consequently the overall strength of the repaired laminate is reduced.

To overcome this limitation, a scrim material 300 or layer is used for achieving a desired adhesive layer thickness and adhesive strength. The scrim cloth 300 can be disposed between the repair preform and the damaged laminate. Suction or applying a vacuum to the sealed system can compress the stack under one atmosphere of pressure. The scrim 300 can prevent the preform from contacting the damaged laminate surface and provide space for the liquid resin to occupy and develop an adhesive layer between the preform and the laminate.

Figure 3:
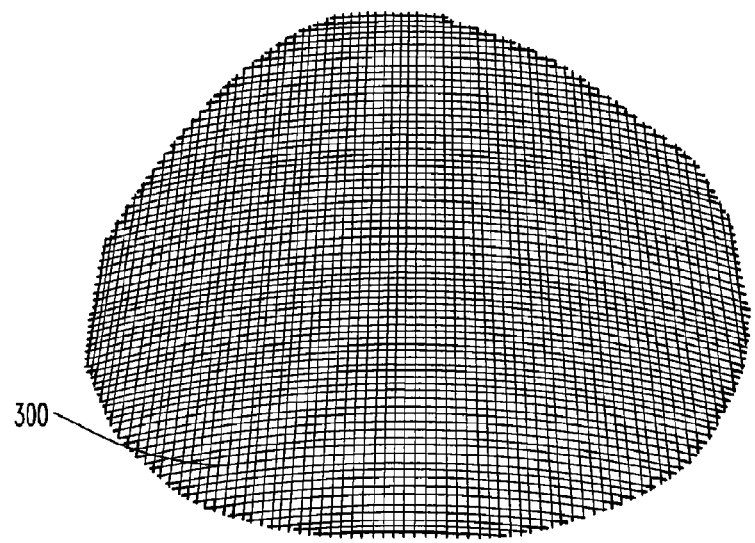
FIG. 3 is a perspective view of a scrim material.

Referring to FIG. 3, the scrim 300 or gauze can be a light textile material made from various fiber systems and polymer forms. The scrim can have a geometry that includes a rectangular weave with a variety of sized openings. Alternatively, the scrim geometry can include a bobbinet with hexagonal-shaped openings. The type of scrim can be chosen to optimize the VARTM adhesive layer strength by controlling adhesive layer thickness and by reinforcing its properties. The thickness of the scrim material can be between 0.0010-0.0025".

In step 206, the pre-assembled VARTM patch is disposed over the damaged area. The patch can be provided as a "stick and peel" form such that as it is disposed over the damaged area, it sticks thereto. To ensure that suction is sustained within the encapsulated fiber preform, the scrim, and the damaged laminate surface, the sealing process described above can also provide a seal in the area covering the damage. As such, two complete concentric seal perimeters are provided surrounding the damaged area between the vacuum bag and the laminate to be repaired. This method is referred to as "double bagging."

Figure 4:
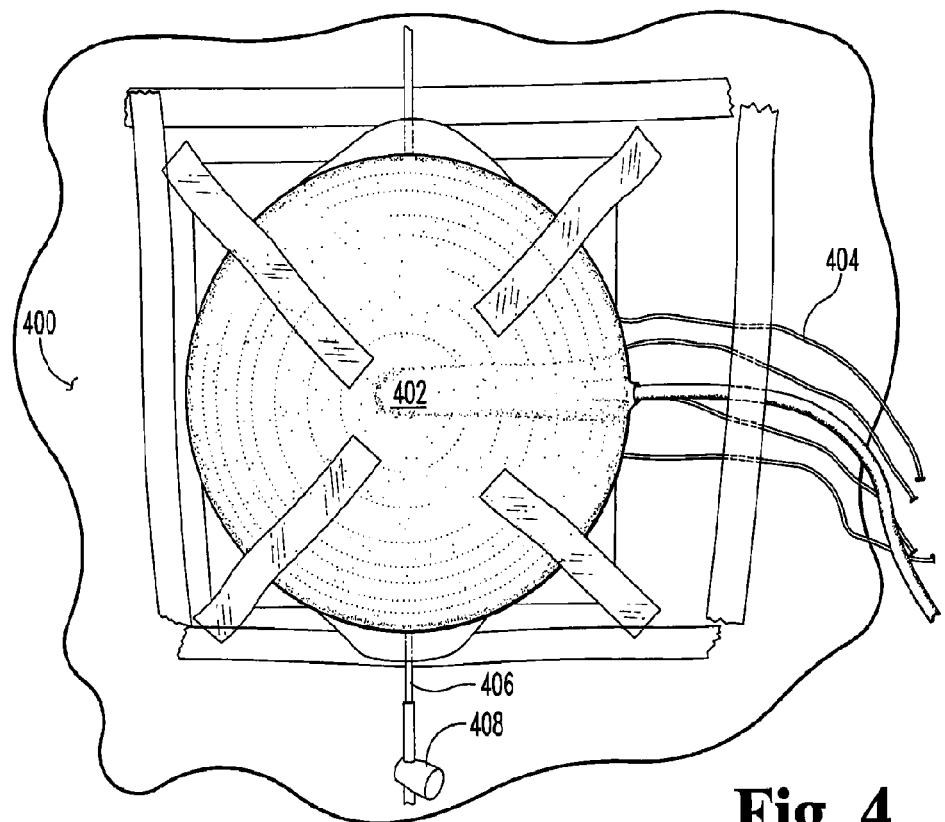
FIG. 4 is a schematic view of a heat system disposed over at least a portion of the VARTM repair patch.

Vacuum can be drawn inside each of these regions independently to avoid potential air leaks during the VARTM process. A first tubing can be provided in which the liquid resin is dispensed for creating the adhesive layer and a second tubing 406 (see FIG. 4) creates the vacuum source for the VARTM process. In FIG. 4, a valve 408 can be disposed between the tubing 406 and vacuum source (not shown).

Before the second bag is assembled to the damaged surface 400, step 208 provides for positioning a heat system over the VARTM patch. This is shown in the embodiment of FIG. 4. The heat system can include a heater blanket 402 and corresponding thermocouples 404 coupled thereto. Once this is assembled, step 210 provides for the assembly of the second vacuum bag. The second vacuum bag can ensure that full atmospheric pressure is available during the curing step. The second vacuum bag can also prevent small air leaks that may otherwise reach the repair patch and introduce voids in or around the layup.

In step 212 of the repair method 200 of FIG. 2, the repair assembly can be preheated. In one embodiment, the repair assembly can be preheated to at least 50° C. for a period of time. In another embodiment, the repair assembly can be preheated to at least 60° C. for a period of time. In a further embodiment, the repair assembly can be preheated to 66° C. or more for a period of time. The preheat step can be at least five minutes, and in other embodiments, fifteen or more minutes. The preheat step, i.e., step 212, can desirably remove air and volatiles.

In step 214, the resin can be mixed in the SEM kit. The SEM kit can then be coupled to the inlet side of the repair patch. Step 216 can be achieved by impregnating the repair patch. In doing so, the inlet valve can be opened to slowly introduce the resin to the repair patch assembly. The impregnation process of step 216 can continue until the resin passes through the outlet tube. The inlet and outlet valves can be closed. An embodiment of the VARTM repair system, as assembled through step 216, is shown in FIG. 5.

Figure 5:
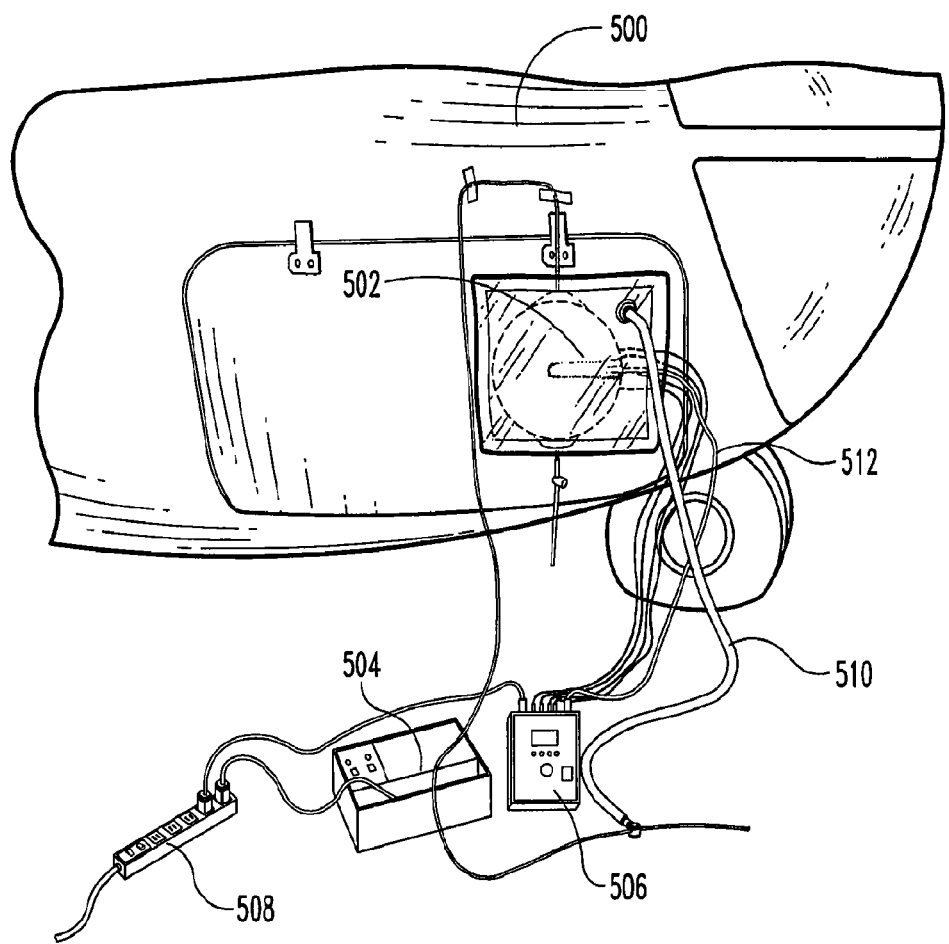
FIG. 5 is a schematic view of a VARTM repair system assembled with a damaged composite surface.

Referring to FIG. 5, an aircraft is shown having a damaged area defined in a composite panel 500. A VARTM repair patch 502 covers the damaged area and is coupled to a heat system 506 and a pump 504. Both the pump 504 and heat system 506 can be electrically coupled to a power supply 508. Other means can be provided for powering the pump 504 and heat system 506 such as batteries or another power supply. A vacuum hose 510 is coupled between the VARTM patch 502 and the pump 504 to deliver or suction air therebetween. Thermocouples and other electrical wires 512 can couple the heat system 506 to a heat blanket or other heating element. Additional components can be included in this assembly as FIG. 5 only represents an embodiment of the repair system in one aspect.

Once the VARTM repair assembly 502 is substantially impregnated, the heat system temperature can be increased to cure the repair in step 218. In one aspect, the temperature is raised to 100° C. or more. In another aspect, the temperature can be increased to 110° C. or more. The temperature can be maintained at a higher point for a duration of greater than an hour. In another aspect, the duration can be two or more hours. In yet another aspect, the duration can be three or more hours.

Once the repair is cured in step 218, the vacuum bag materials and pressure adhesive layer can be removed from the composite panel in step 220. The repair patch can be inspected and a paint system can be applied over the repair to match the color of the panel.

The fiber preform developed in the above-described VARTM repair process 200 can achieve full structural performance of the repaired system while also ensuring full impregnation by the liquid resin system. Further, when the surface to be repaired is non-planar, it can be desirable for the fiber perform to be conformable to the local curvatures of the surface. This can be accomplished by considering the properties of the preform such as weight, thickness, weave pattern, and non-woven geometry. The permeability of the fiber preform can be measured experimentally or predicted by non-Newtonian fluid mechanics analysis. Permeability can be controlled through the choice of preform construction while ensuring complete impregnation of polymer resin systems with viscosities greater than water in reasonable impregnation times.

The effective composite layer mechanical properties can be determined through either experimental measurements or micromechanical and laminated plate analysis methods. In addition, the plan form of the preform including the dimensions of each layer of the preform and its principal materials direction can be modified to achieve the optimum geometry for structural performance and minimum weight. Typically, the design can require a finite-element analysis of the repair to assess its structural characteristics.

Several tests have been performed to demonstrate the effectiveness of the VARTM repair method. These tests were carried out for composite sandwich panels under three conditions, namely, a pristine condition (without damage), a damaged condition (containing circular holes of about 76 mm), and a repaired condition. As discussed with respect to FIG. 2, the repair included replacing the core in the region of the damage by adhesive bonding and VARTM repairs of both the sandwich skins with a tapered five-layer patch. The damage was assessed as the difference between the pristine and damaged panel strengths. Repair efficacy was measured as the percent of the pristine panel strength regained by the repair.

For the series of tests, the test panel geometry included lateral dimensions of 533.4 mm (21 inches) by 533.4 mm (21 inches) with Nomex honeycomb core thickness of 12.7 mm (0.50 inches). The skins of the sandwich consisted of four plies of unidirectional prepreg (IM7/8552) in the laminate configuration of $[-60/0/0/+60]_T$. The taper angle of the honeycomb was 20 degrees to the plane of the sandwich. The load introduction regions around the perimeter of the honeycomb were reinforced with eight additional plies of plane weave fabric (IM7/8552) prepreg. The system was subjected to autoclave cure at the temperature cycle specified by the material supplier and an autoclave pressure of 3.06 atmospheres (45 psi). The load introduction frame was attached to the sandwich with sixty mechanical fasteners.

Two test conditions that were analyzed included pure shear and biaxial tension with an x-y load ratio of 1:1. The test specimens were loaded monotonically to failure while monitoring electrical resistance strain gages mounted on both surfaces of the sandwich panel. In the pure shear test configuration, the load is introduced through two load rams at opposite corner points. The biaxial test configuration includes a corner load configuration of the pure shear test that has been replaced by four load rams at the midpoints of the panel edges. Equal forces in the four rams yielded a biaxial ratio of 1:1.

Figure 6:
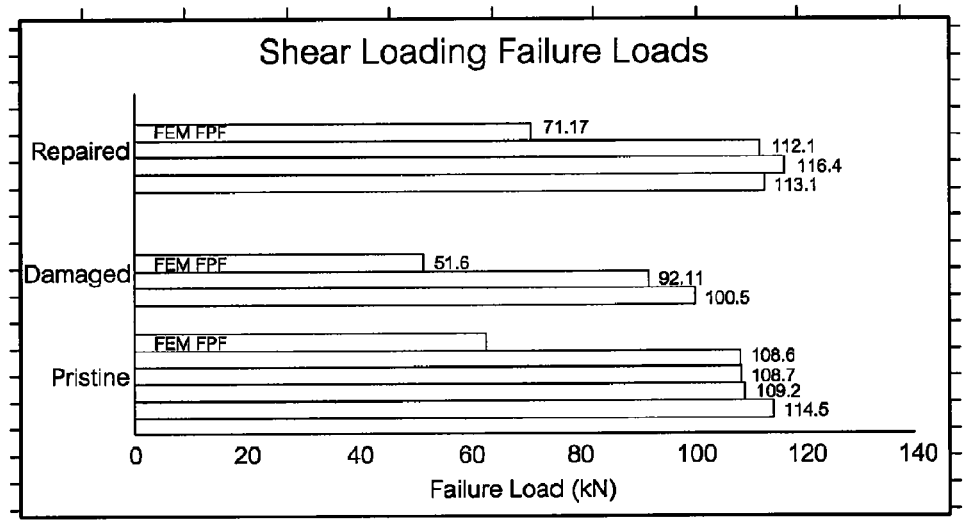
FIG. 6 is a chart of shear loading failure loads from an experimental testing.

A finite-element analyses carried out utilized the MSC-NASTRAN code with plate and shell elements. The finite-element model predictions of load versus strain were consistent with experimental observations, as were the location of failure initiation sites and mechanisms. The test results for the pure shear tests are shown in FIG. 6, where the damage produced by the through circular hole of 50.8 mm (2 inch) diameter yielded an average strength reduction of 12.7 percent as compared to the mean strength of the pristine panels. The repaired panel average strength exceeded the pristine panel strength by 3 percent. Clearly, the repair was successful for the pure shear loading.

Figure 7:
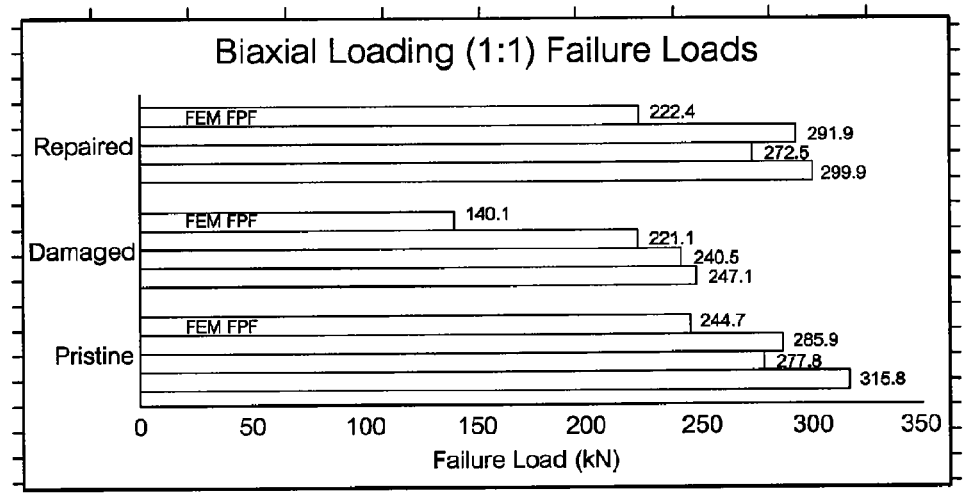
FIG. 7 is a chart of biaxial loading from an experimental testing.

Referring to FIG. 7, the test results for biaxial tension are shown. Here, the damaged panel average strength is reduced by twenty percent as compared to the pristine panel average strength. The repaired panel average strength was two percent less than the pristine panel average strength. The variability of the pristine panel strength was greater than that of the repaired panel strengths. While the biaxial test results did not demonstrate full strength recovery of the repair, the modest difference suggests that this repair method is an acceptable method to restore virtually full panel strength.

Figure 8:
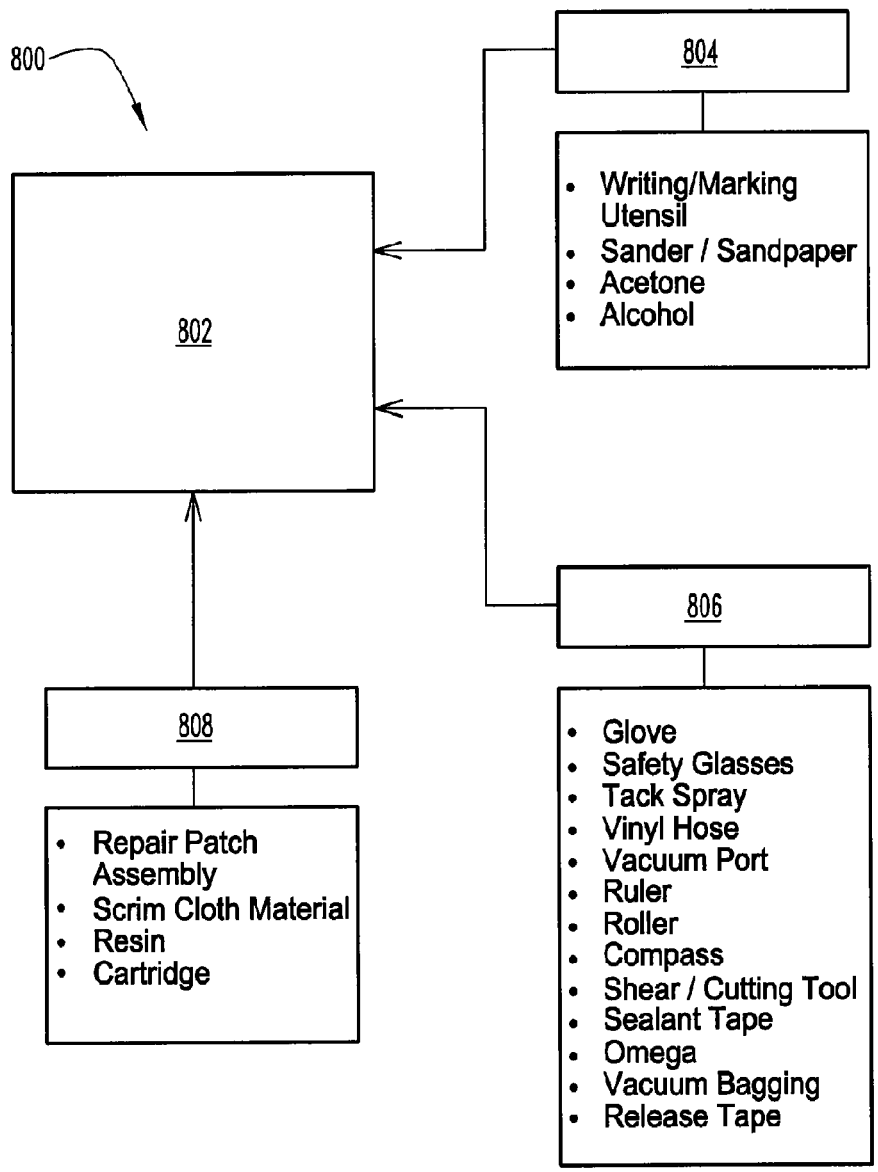
FIG. 8 is a schematic view of an VARTM repair system.

In another embodiment of the present disclosure, a kit or system can be provided for the VARTM composite repair process. The repair kit can contain a plurality of pre-assembled repair patches and other necessary materials and equipment to repair damage to composite aircraft in a field environment. The system can be easily stored in an aircraft and the materials used in the system can include a long shelf life. The contents of a system 800 are shown in FIG. 8. The system 800 can include a case or housing 802 for storing the contents thereof. The contents can include surface preparation items 804, repair equipment 806, and repair patch and resin components 808.

Surface preparation items 804 can include a marker, pen, pencil, or other writing instrument. A sander or sandpaper can be included, as well as acetone and alcohol for cleaning the surface of a damaged composite panel. Repair equipment 806 can include a glove, safety glasses, tack spray, a vinyl hose, a vacuum port, a ruler, a roller, a compass, scissors or a shearing tool, a razor or knife, sealant tape, omega, vacuum bagging, and tape. Other equipment may be included in a system. Other embodiments may not include all of the items illustrated in the repair equipment 806. The repair patch and resin components 808 may include one or more repair patch assemblies as described in the present disclosure. Resin cartridges, both new and replacement cartridges, can also be included. Other items may be included in the components 808. Wipes, towels, rags, tools (e.g., screwdriver, hammer, and nails), etc. can also be included in a repair system. A computer, digital tablet, microprocessor, etc. may also be included in a repair system for controlling one or more aspects of the repair process.

The repair method is not limited to flat or contoured fuselage skin but could also be used to repair structural members such as stringers, frames, and bulkheads. In addition, a system may include one or more items not shown in FIG. 8. Alternatively, a system may include fewer items depending on the application and desired use.

In one example, the system can be used when damage is limited to a single side (e.g., on an outer surface of a composite panel). Alternatively, the system can be used when two sides, e.g., an inner and outer surfaces, are damaged. A system can include a surface preparation material, a plurality of repair patches, scrim material, bagging material, vacuum ports, bagging adhesive, premeasured resin, a dispenser, a vacuum pump, and a power supply.

The finite-element results were also indicative of the difference between panel failure predictions and actual test results. The Tsai-Wu failure criterion was utilized in the predictions of first ply failure, while the test results indicate ultimate failure of the panel.

In no instance in the test program did the VARTM repair delaminate from the surface ply of the sandwich laminate skin, thereby demonstrating the robustness of the adhesive joint between the damaged laminate and the repair patch. The repair patch can remain attached to the surface ply even after catastrophic failure.

In another embodiment, an accelerated cure of the resin system can be achieved. In this embodiment, the bagging material can be equipped with one or more heating elements to provide thermal cure above ambient conditions.

In one embodiment, the repair system or system can include a digital pad, tablet or computer. The digital tablet can provide control of the VARTM process and thermal cure. Further, it can provide the user with information necessary to choose the correct repair patch geometry, carry out a successful VARTM repair process, and determine the final repair quality.

The software and data for the pad system can also allow for user input of the location of the damaged structure via a touch screen. In one aspect, the user can load a structural image of the damaged area and the software system can thereby determine the size and geometry of the required patch. The system can further provide an audio and/or visual description of the repair process that guides the user through each repair step to complete a successful repair process.

The repair system can further provide the geometry of specific structures so that when the geometric position of the damage is located by the user using a touch pen on the image of that structure, an analysis will be performed to determine the repair patch geometry. The results of the analysis can allow the user to choose the correct patch geometry from those provided in the system. In one aspect, the software can audibly or visually instruct the user to select the correct patch geometry. The system can also include a non-destructive test system sufficient to determine the quality of the repair.

One advantage of the present disclosure is the reduction or elimination of fume emission in the repair area. In conventional repair areas, a repair worker can be exposed to fumes while mixing the resin and impregnating the fiber. The repair worker completes these tasks by hand. In the present disclosure, however, the repair fibers are impregnated under a vacuum so that the repair worker is not exposed to the resin.

Also, the repair quality is improved according to the methods of the present disclosure. In particular, the laminate quality is improved since better impregnation is achieved with higher fiber content. The consistency of the repair mechanical properties is improved because these properties can be less dependent on the workmanship of the repair worker. In other words, more steps in the repair process are automated with improved quality.

The VARTM repair process also can use less resin than conventional wet layup processes, and therefore fewer resources and/or supplies are required to complete a repair. As described above, all of the materials, resources, and supplies (e.g., equipment) can be packaged in a hand-held system. The system can include repair performs (cut to size), resin, a pump, and repair fixturing (some of which is shown below in FIG. 7). A system can further include scrim cloth (of various shapes and sizes), one or more pieces of titanium (of various shapes and sizes), and core material (e.g., honeycomb fiber material). It is further contemplated that one or more of the structure components is removed after the VARTM process and can be disposable.

While embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of repairing a damaged portion of a panel formed of composite material, comprising:
   preparing the damaged portion for repair;
   disposing a vacuum-assisted resin transfer molding repair patch assembly to substantially cover the damaged portion, wherein the repair patch assembly is a preassembled repair patch assembly including an injection plate, a scrim material, and an injection tube defining the inlet side of the repair patch assembly;
   wherein the scrim material includes a plurality of openings to provide space for a liquid resin to occupy;
   covering the repair patch assembly with a first vacuum bag assembly;
   disposing a heat blanket over the first vacuum bag assembly;
   covering the heat blanket and the first vacuum bag assembly with a second vacuum bag assembly;
   introducing liquid resin through the injection plate of the repair patch assembly;
   impregnating the repair patch assembly including the scrim material with the introduced liquid resin by independently drawing a vacuum inside the first vacuum bag assembly and the second vacuum bag assembly to substantially impregnate the repair patch assembly including the scrim material with the liquid resin;
   heating the repair patch assembly with the heat blanket to ensure full impregnation of the repair patch assembly including the scrim material;
   curing the repair patch assembly to provide an adhesive joint between the panel and the repair patch assembly; and
   removing the first vacuum bag assembly, the second vacuum bag assembly, and the heat blanket while not removing the repair patch assembly from the panel.

2. The method of claim 1, wherein the preparing step comprises removing the damaged portion from the panel.

3. The method of claim 1, wherein the preparing step comprises replacing the damaged portion with a honeycomb core material.

4. The method of claim 1, further comprising cleaning the damaged portion and nearby area with a cleansing tool.

5. The method of claim 1, further comprising:
   preheating the repair patch assembly to a desired temperature; and
   removing air or volatile material from the repair patch assembly.

6. The method of claim 1, further comprising: mixing the liquid resin in a cartridge; and coupling the cartridge to an inlet side of the repair patch assembly.

7. The method of claim 1, further comprising discontinuing the impregnating step when the liquid resin begins to pass through an outlet side of the repair patch assembly.

8. The method of claim 1, further comprising controlling the introducing step by opening or closing an inlet valve or outlet valve.

9. The method of claim 1, wherein the curing step comprising increasing the temperature of the repair patch assembly to a temperature greater than 100° C.

10. The method of claim 1, wherein scrim material having a predetermined thickness configured to provide an adhesive layer thickness between the repair patch assembly and the damaged portion.

11. The method of claim 1, wherein the scrim material is one of a gauze or a textile material.

* * * * *